United States Patent [19]

Bailey et al.

[11] Patent Number: 5,739,597

[45] Date of Patent: Apr. 14, 1998

[54] ADAPTER DESIGN FOR DUAL SOURCED POWER

[75] Inventors: Warren D. Bailey, Pittsboro; Elie M. Najm, Raleigh; Robin C. Wells, Cary, all of N.C.

[73] Assignee: International Business Machines Corporation, Armonk, N.Y.

[21] Appl. No.: 661,273

[22] Filed: Jun. 10, 1996

[51] Int. Cl.$^6$ ................................................. H04L 12/40

[52] U.S. Cl. ........................ 307/85; 307/80; 307/86; 307/140; 307/66; 370/402; 370/465; 365/226; 364/492; 364/273.5

[58] Field of Search ..................... 307/64, 66, 80, 307/85, 86, 87, 116, 126, 139, 140; 395/750, 200.02, 280, 281, 282, 284, 311; 364/483, 492, 273.5, 948.4, 948.91; 340/517; 370/401, 402, 445, 465; 365/229, 226

[56] References Cited

U.S. PATENT DOCUMENTS

| | | | |
|---|---|---|---|
| 4,044,268 | 8/1977 | Hammel et al. | 307/66 |
| 4,427,899 | 1/1984 | Bruns | 307/66 |
| 4,492,876 | 1/1985 | Colbert et al. | 307/66 |
| 4,617,473 | 10/1986 | Bingham | 307/66 |
| 4,623,884 | 11/1986 | Ihara | 370/86 |
| 4,704,542 | 11/1987 | Hwang | 307/66 |
| 5,297,141 | 3/1994 | Marum | 307/86 |
| 5,424,659 | 6/1995 | Stephens | 326/31 |
| 5,432,386 | 7/1995 | Cerra | 307/66 |
| 5,517,153 | 5/1996 | Yin et al. | 327/546 |
| 5,568,610 | 10/1996 | Brown | 395/282 |
| 5,579,524 | 11/1996 | Kikinis | 395/750 |
| 5,594,874 | 1/1997 | Narayanan | 364/DIG. 1 |
| 5,603,040 | 2/1997 | Frager | 395/750 |
| 5,606,704 | 2/1997 | Pierce | 395/750 |
| 5,617,418 | 4/1997 | Shirani | 370/465 |
| 5,617,419 | 4/1997 | Christensen | 370/471 |

*Primary Examiner*—William M. Shoop, Jr.
*Assistant Examiner*—Peter Gaujian
*Attorney, Agent, or Firm*—Joscelyn G. Cockburn

[57] ABSTRACT

A communications adapter card includes a circuit arrangement for causing an electrical voltage to be supplied to the card from a first voltage source, even if a second voltage source is available, and from the second voltage source if the first voltage source is not available. The circuit arrangement includes a Field Effect Transistor (FET) with its gate electrode connected to a control circuit which puts the FET in an off-state to inhibit the second voltage source from supplying voltage to the card if the first voltage source is available, and puts the FET in an on-state to supply voltage to the card if the first voltage source is not available. The invention makes it possible for a single communications adapter card to be used to attache power managed and non-power managed personal computers (PCs) to a Local Area Network (LAN).

12 Claims, 4 Drawing Sheets

ADAPTER DESIGN FOR DUAL SOURCED POWER

BACKGROUND OF THE INVENTION

1. Field of the Invention

The present invention relates to electrical circuits in general and, in particular, to electrical circuits which control the voltages to a load, such as a communications adapter card.

2. Prior Art

The prior art abounds with circuitries which control the application of voltages to a load. The load could be an electrical circuit, non-volatile memory or the like.

U.S. Pat. No. 4,427,899 describes a switching circuit for providing supply voltage, to a load, from either a primary voltage source or a secondary voltage source. The switching circuit consists of a field-effect transistor having a gate terminal, source terminal and drain terminal. The load is connected, via a series connected diode, to the primary voltage source and, via the source-to-drain terminals of the FET, to the secondary voltage source. A voltage divider is connected between the source electrode, the gate electrode and in shunt with the load.

Other circuit arrangements for connecting one of two active voltage sources to a load are set forth in U.S. Pat. Nos. 4,044,628; 4,617,473; 4,704,542; 4,492876 and 5,517,153. Even though the above circuitries work well for their intended purposes, they are suited for one type of application. In particular, the circuits are suited for an application in which two active voltage sources are available and if one become inoperative, the other is selected to provide the voltage. This type of application is called back-up power switching.

However, there are other types of applications for which the prior art circuitries are not suited. In general, the prior art circuits do not appear to work well in an application in which switching between two active voltage sources are not required.

In particular, power management over Local Area Network (LAN) application does not require switching between active voltage sources. Therefore, the above prior art circuits are not suitable for use in this application. A short discussion of power management over LAN and the problem which is solved by the below described invention will now be given.

The proliferation of personal computers (PCs) raises concerns regarding the large amount of electrical energy consumed by the PCs. Most of the PCs are interconnected via communications facilities, such as LANs or the like. The communications facilities provide the infrastructure over which the PCs communicate. It has been proposed that a frame carrying instructions to be used to selectively reduce power to the PCs and/or restore power to the PCs could be transmitted from a management station to the communications facility interconnecting the PCs. The PCs would receive the frame and, depending on the contents of the frame and the power state of the PCs, would either power-up or power down. In fact, the power management procedure would be automatic and occurs without intervention from human operators. Further discussion regarding power management via communications network is set forth in U.S. Pat. Nos. 5,404,544 and 5,396,636.

In order to manage power to the PCs via the LAN interconnecting them selected portion of the adapter card interconnecting respective PCs to the LAN have to be powered-up while the PC is powered down. As is used in this application, "Powered-UP" means the application of an appropriate voltage to a device, and "Power Down" means the discontinuation of the voltage to the device. Even though the power management feature is being and will continue to be implemented on PCs, there are some that do not have the feature. It is desirable to provide one type of adapter for attaching power managed and non-power managed PCs to the LAN. The invention to be described hereinafter provides such an adapter.

SUMMARY OF THE INVENTION

It is, therefore, an object of the present invention to provide a communications adapter for attaching power managed and non-power managed PCs to a LAN.

It is another object of the invention to provide an appropriate circuit for controlling voltage supply to the adapter and in so doing, provides a single type of adapter card for attaching power managed and non-power managed PCs to a LAN.

The present invention accomplishes these and other objects by providing an adapter with a first power interface which receives voltages from the PC bus, a second power interface which receives voltage from an independent voltage source and a circuit arrangement coupling the first power interface and the second power interface. The circuit arrangement is interconnected and controlled so that if the adapter is mounted in a power-managed PC, the first power interface is rendered inoperative and voltage to the adapter card is received at the second power interface, from the independent voltage source. Likewise, if the adapter is mounted in a non-power managed PC, the second power interface is rendered inoperative and voltage is received from the PC bus at the first power interface.

In particular, the circuit arrangement includes an FET with a Drain electrode, a Source (S) electrode and a Gate (G) electrode. The Drain (D) electrode is connected to the +5 voltage plane of the adapter card and the positive (+) terminal of the second power interface. The Gate electrode is connected to the ground terminal of the second power interface. A voltage divider circuit also connects the Gate electrode to a ground terminal and a positive (+) terminal in the first power interface. The ground terminal of the first power interface is connected to the ground plane of the adapter card. Finally, the Source electrode is connected to a +5 voltage terminal in the first power interface.

The foregoing features and advantages of the invention will be more fully described in the accompanying drawings.

DESCRIPTION OF THE PREFERRED EMBODIMENT

Figure 1:
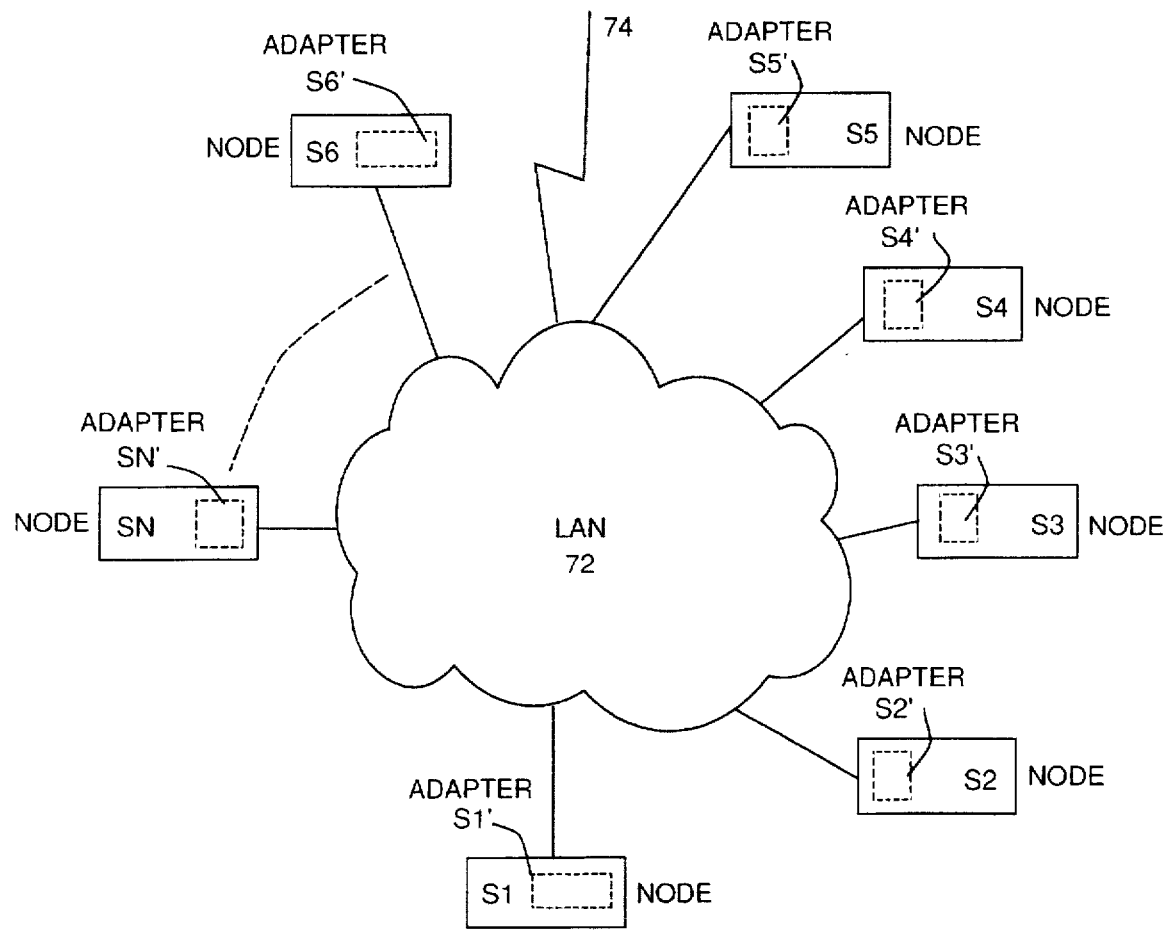
FIG. 1 shows a schematic of a computer network incorporating the teachings of the present invention.

FIG. 1 shows a computer network embodying the teachings of the present invention. The computer network includes a plurality of nodes S1 through SN interconnected by LAN 72. Each of the nodes is connected to the LAN by adapter card S1' through SN'. The broken lines between nodes S6 and SN indicate that additional nodes could be connected to the LAN 72. Each of the nodes (S1-SN) can be one of a variety of devices including personal computers, workstations, or the like. The LAN 72 can be any of the well known local area networks used to interconnect devices. For example, LAN 72 could be a Token Ring LAN practicing the Token Ring protocols specified in the IEEE 802.5 standard, or an Ethernet LAN practicing the protocols described in the IEEE 802 CSMA/CD, or an ATM LAN practicing the protocols specified by the ATM forum, or a token bus LAN or the like. These types of LAN are well known in the prior art and further detailed description will not be given.

Each of the nodes is connected to the LAN by respective conductors and the adapter card sitting in each of the nodes. As stated above, the adapter cards are such that they can be used in nodes which include the power management function or nodes which do not include power management functions. More detail will be given hereinafter. Suffice it to say at this point that the power to each of the nodes can be controlled by a control station connected to LAN 72 or from a remote location over communication link 74.

Even though each of the nodes in FIG. 1 can be one of many types of devices, for purposes of this application, it is assumed that the nodes are PCs. This should not be construed as a limitation on the scope of the invention since it is well within the skill of the artisan to use the invention to be described hereinafter with other devices other than personal computers.

Figure 2:
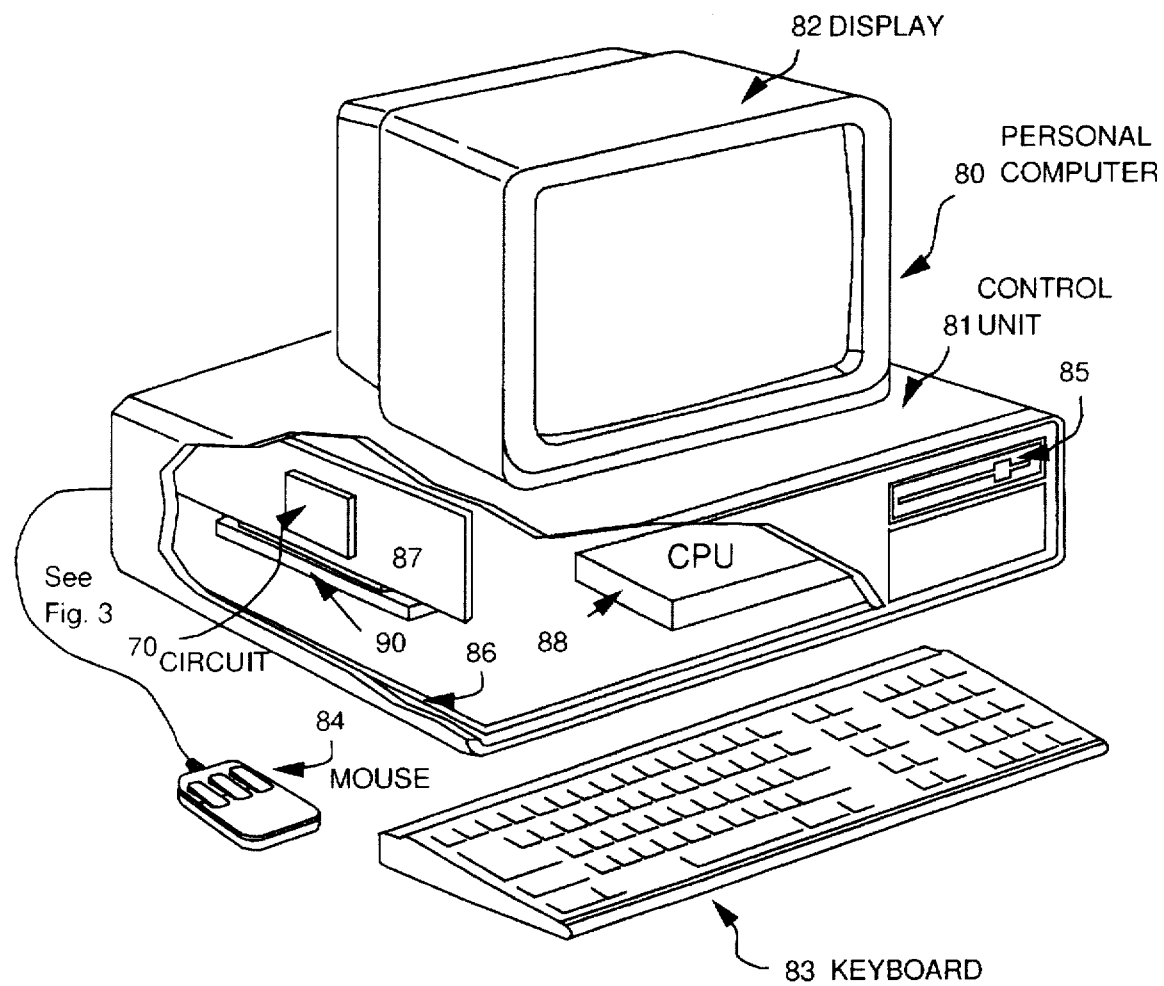
FIG. 2 shows a pictorial view of the PC incorporating the present invention.

Referring to FIG. 2, a pictorial view of a personal computer 80 which can be used in one of the nodes of FIG. 1 is shown. The PC 80 might include a display 82, a control unit 81, a disk drive 85, a keyboard 83 and a mouse 84 connected to the control unit. Each of these items are well known in the prior art, therefore they will not be described in detail. Suffice it to say that the keyboard is used for entering information while the disk drive 85 is another means of entering or extracting information on a diskette, from the PC. The cover of the PC is broken away to show the internal portion of the PC which is relevant to the present invention. The relevant feature in the PC includes a CPU 88 with an I/O Bus 86. The I/O Bus 86 is coupled to connector 90 and an adapter card identified by numeral 87 is plugged into the connector 90. It should be noted that the adapter card 87 is identical to the adapter cards S1' through SN', FIG. 1.

Circuit arrangement 70 is mounted on adapter card 87 and, as will be explained subsequently, provides the control function to select power, either from a secondary power interface or the main power interface. It should be noted that the main power interface is the portion of the adapter card 87 which is plugged into connector 90 and receives power from the bus 86.

Figure 3:
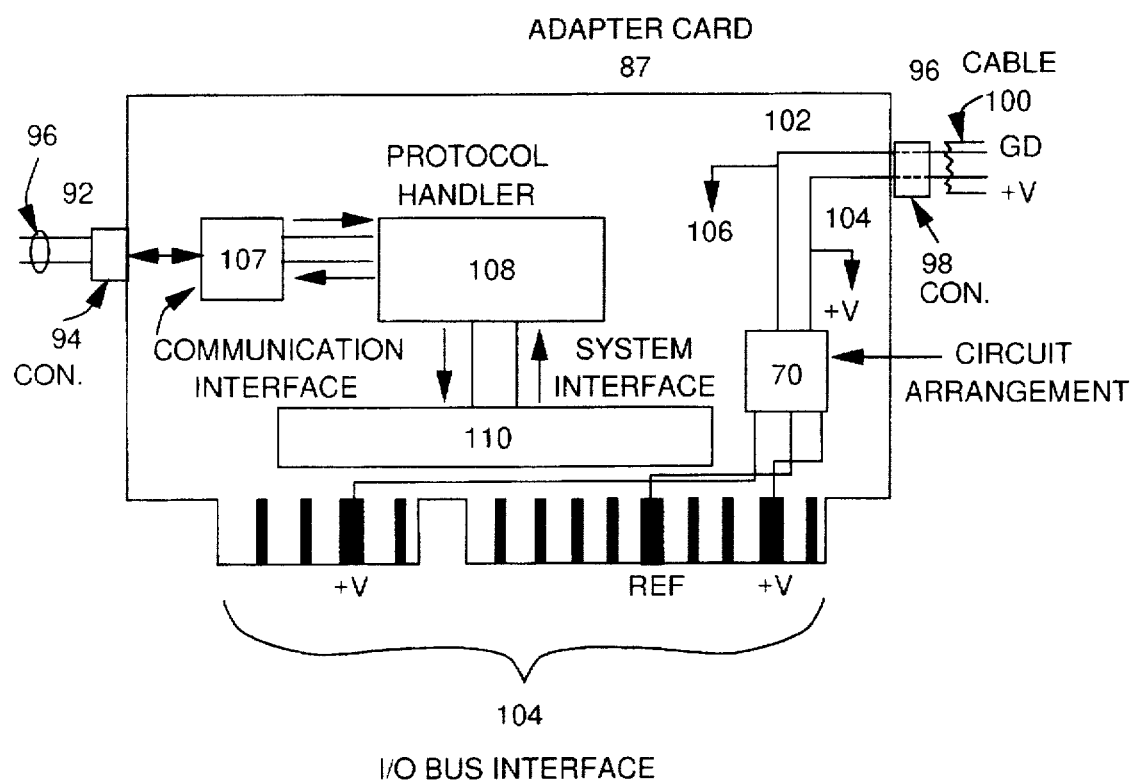
FIG. 3 shows a functional diagram of the adapter card used in FIG. 1 and designed according to the teachings of the present invention.

FIG. 3 shows a block diagram for adapter card 87. The card includes a communication interface 92 with connector 94. The connector 94 couples the adapter card via conductor 96 to the LAN (FIG 1). The adapter, also includes secondary power interface 96 with connector 98 for connecting the adapter card to a secondary power supply (not shown) via a power cable 100. The power cable, when plugged into connector 98, interconnects a ground wire (labeled GD) and a +V wire to a pair of terminals on the card. Each of the terminals is connected over conductor 102 and 104 to circuit arrangement 70. As stated previously, circuit arrangement 70 includes a control circuit which allows voltage to be supplied from the cable 100 even if voltage is available at the I/O Bus interface 104. It should be noted that the I/O Bus interface 104 attaches the adapter card 87 to the I/O Bus 86, FIG. 2, via connector 90.

Still referring to FIG. 3, I/O Bus interface 104 includes a plurality of conductors shown in the figure by solid lines. The conductors include both signal carrying conductors and voltage carrying conductors. For purposes of description, the voltage carrying conductors are identified by the wider of the conductors in the interface. By way of example, there are three voltage receiving conductors providing voltage two +V voltages, and a reference (REF) level voltage to the adapter card. Each of the voltage conductors are connected by respective conductors to circuit arrangement 70. Details of the circuit arrangement 70 will be given hereinafter. Suffice it to say at this point that the circuit arrangement is such that if the cable is attached to connector 98, the voltages outputted from the PC bus on the voltage indicating conductors in I/O Bus interface 104 are isolated and voltage with respect to ground plane 106 on the card is supplied from the cable. It should be noted that in FIG. 3, the load which is driven by the voltage supply by cable 100 or from the PC bus when the cable is not attached to connector 98 is the electrical components which are connected between the voltage plane +V and the ground plane 106.

Still referring to FIG. 3, the adapter card 87 provides function other than the power features of the card. As stated previously, the adapter card provides the function necessary to attach the PC or other devices to a LAN. To carry out this function, the adapter card includes a communication interface section 107, a protocol handler 108 and a system interface section 110. The communications interface section 107 is connected by a bi-directional conductor to the connector 94. The communications interface section provides the necessary functions which are required to receive and transmit frames through connector 94 into the LAN to which it is connected. The functions provided by the communication interface section 107 include:

A) Encoding and decoding the data for transmission on and reception from the network, respectively;

B) Signal level shaping of the data prior to transmission;

C) Electrical noise suppression;

D) Electrical isolation between LAN and adapter.

The Protocol Handler 108 is connected by bi-directional busses to the Communication Interface Section 107 and System Interface Section 110. The direction of data transmission are shown by the respective arrows. The Protocol Handler 108 is protocol specific and performs the processing of data according to the protocol required by the LAN to which this adapter is connected. For example, if the LAN is a token ring LAN, then the protocol handler 108 would practice the token ring protocol set forth in the IEEE 802.5 standard. Likewise, a Protocol Handler for an ethernet LAN would practice the ethernet protocol, an ATM protocol handler would practice the ATM protocol and so forth.

The System Interface Section 110 couples the adapter to the I/O Bus interface. This section of the adapter performs the functions which are necessary to pass a frame from the Protocol Handler to the bus of the PC to which the adapter is connected. Usually, the system interface section 110 includes circuits which function according to the type of bus in the PC. For example, if the bus is PCI bus or an ISA bus or a microchannel bus, the interface section would include circuits that perform or process the data so that it can be accepted by the respective one of the busses.

Figure 4:
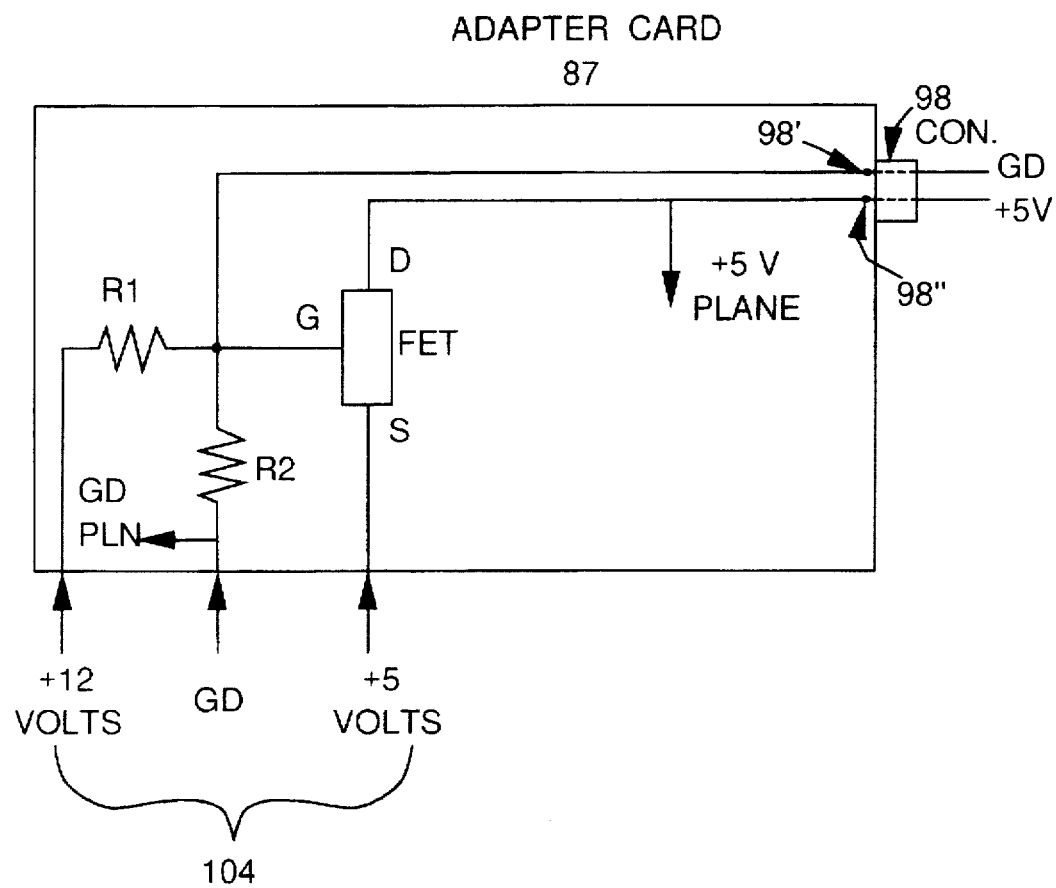
FIG. 4 shows a diagram of the circuit according to the teachings of the present invention. The circuit controls the voltage on the adapter card.

FIG. 4 shows a schematic of the adapter card 87 and, in particular, the details of circuit arrangement 70. The circuit arrangement 70 includes a FET having Gate (G) electrode, Drain (D) electrode and Source (S) electrode. Each of the electrodes are identified by alphabetic characters G, D and S. The wires in cable 100 are identified by their respective voltage ground (GD) and a positive voltage level +5 Volts. The connector 98 has two voltage pins or terminals 98' and a 98". The Drain (D) electrode is connected by a conductor to one of the terminals 98". The Gate electrode (G) is connected by a second conductor to terminal 98' When the cable 100 (FIG. 3) is plugged into connector 98, the ground wire in the cable is connected via the connector 98 to terminal 98' on the adapter card. Likewise, the +5 voltage line or wire is connected through the connector to terminal 98'. The connection through connector 98 is shown by respective broken lines.

Still referring to FIG. 4, the Gate (G) electrode of the FET is connected by voltage dividers R1 and R2 to +12 volts terminal and ground terminal in the I/O Bus interface 104. The Source (S) electrode is connected to +5 volts terminal in the I/O Bus Interface 104. As stated previously, the respective voltages in this interface are provided on the PC I/O Bus.

Still referring to FIG. 4, the primary power source for the adapter is the voltage provided at the I/O Bus interface 104 when the adapter is plugged into a PC which does not have the power management feature discussed above. For PCs having the power management feature, the secondary power interface 96 provides the voltage to the card. With respect to FIG. 4, even though specific voltages are shown, these should be considered as illustrative only since the invention can be used with low power, such as 3 volt, devices. The FET is selected such that the drain-to-source resistance is as low as possible. When the primary voltage source is supplying voltage to the adapter card, this ensures that the voltage drop across the FET is small and the resulting voltage potential applied to the adapter card +5 voltage plane is within the adapter card specification for +5 volt tolerances. The Gate electrode is tied through resistor R1 to the +12 volt source or supply line of the I/O Bus. The Gate electrode is also tied through resistor R2 to the adapter card ground plane (GDPLN) and to the ground plane of the primary supply. In the preferred embodiment of this invention, R1 is approximately 1.3K ohms and R2 is approximately 4.7K ohms. If the cable 100 is not plugged into connector 98, the secondary power interface is disconnected. This implies power is drawn from the PC bus. The voltage at the Gate electrode of the FET will be: 12 Volts ×4.7K/(4.7K +1.3K) =9.4 Volts. Under these conditions, the FET transistor will have a very low impedance between the drain and source, thus connecting +5 volts from the I/O Bus to the plus +5 volt plane of the adapter card. This is the "normal" mode of operation for an adapter card in a non-power managed computer.

For the power management computer, the voltage at the secondary power interface 96 is present since the cable would have been plugged into connector 98. In this configuration, the primary voltage from the PC Bus is also present on the respective power lines in that interface. The voltage on the gate pin of the FET is at or very near ground since the gate is tied directly to the ground pin or terminal 98', connected to the GD wire in Cable 100, in the secondary power interface 96. As a consequence, the FET will have a very high impedance between the Drain (D) and Source (S) pins, thus isolating the power source provided from the PC Bus from the secondary power source. In this configuration, the adapter card draws its power from the secondary power interface.

As stated above, the adapter card draws its power from the second power interface when it is connected. As a consequence, the adapter card is not affected if the primary voltage source from the PC Bus is removed. Consequently, the power management feature which shuts off the PC also removes power from the Bus. Since the card is powered from the secondary power interface, it uses a relatively small amount of power to monitor the network and when the above-described frame is received with "wake-up instructions", the adapter card outputs signals which are returned to the power control circuit of the PC and are used to power-up the PC.

While the invention has been particularly shown and described with reference for a preferred embodiment hereof, it will be understood by those skilled in the art that various changes in form and detail may be made herein without departing from the spirit and scope of the present invention.

We claim:

1. An adapter card for connecting a device to a communications network comprising:

a communication interface section to connect the card to the communications network;

a system interface section to couple the card to the device;

a protocol handler for coupling the communications interface section and the system interface section; said protocol handler processing frames in accordance with a predetermined communication protocol;

a positive voltage plane for distributing voltage to said adapter card;

a ground plane disposed on said adapter card;

a first voltage interface having a ground terminal and a positive terminal, operatively coupled to the positive voltage plane and the ground plane;

a second voltage interface including a reference terminal and two positive terminals; and a circuit arrangement including a switching device having a Gate electrode directly connected to the ground terminal of the first voltage interface and a voltage divider means connecting said Gate electrode to selected ones of the terminals in the second voltage interface wherein if a voltage is sensed at the first voltage interface, the switching device is placed in a non-conductive mode and the voltage on the first voltage interface is applied to the card, and if no voltage is sensed, the switching device is rendered conductive.

2. The adapter card of claim 1 wherein a device includes a personal computer operating in a low power mode.

3. The adapter card in claim 1 or claim 2 wherein the predetermined communications protocol includes a Token Ring protocol.

4. The adapter card of claim 1 or claim 2 wherein the predetermined communications protocol includes an ethernet protocol.

5. The adapter card of claim 1 or claim 2 wherein the predetermined communications protocol includes an ATM protocol.

6. The adapter card of claims 1 or 2 wherein the predetermined communications protocol includes an FDDI protocol.

7. The adapter card of claims 1 or 2 wherein the predetermined communications protocol includes an ISDN protocol.

8. The adapter of claim 1 wherein the switching device includes a FET having a Drain electrode and a Source electrode.

9. The adapter of claim 8 or claim 1 wherein the voltage divider means includes a first resistor connecting the Gate electrode to a selected terminal in the second voltage interface; and a second resistor connecting the Gate electrode to another selected terminal in the second voltage interface with said second resistor forming parallel configuration with said first resistor.

10. The adapter of claim 8 further including a first connector mounted at the ground terminal of the first voltage interface and operable to receive a ground voltage signal;

a second connector pin to receive a positive signal mounted at the positive terminal of the first voltage interface;

a first conductor connecting the Gate electrode to the first connector pin;

a second conductor connecting the Drain electrode to the second connector pin;

a third conductor connecting the Source electrode to a selected terminal in the second voltage interface.

11. In an adapter card having an I/O interface for mating with an I/O bus of a computer and receiving voltage signals therefrom and a secondary power interface for receiving voltage signals from a secondary voltage supply, a circuit arrangement for selecting the secondary power supply as the power supply providing power to the adapter card, comprising:

an FET having a Gate electrode, a Drain electrode and a Source electrode;

a first connector pin, at the secondary power interface, to receive a ground voltage signal;

a second connector pin at the secondary power interface to receive a positive voltage signal;

a first conductor connecting the Gate electrode to the connector pin;

a second conductor connecting the Drain electrode to the second connector pin;

a third conductor connecting the Source electrode to a first terminal in the I/O Interface; and a voltage divider circuit connected to the Gate Electrode and to a second terminal and third terminal located in said I/O Interface wherein when a predetermined voltage is sensed in the second interface, the FET is rendered non-conductive and voltage is distributed from said secondary interface to the card.

12. A circuit arrangement for supplying, to an adapter card, voltage from a preferred one of two voltage sources, said circuit arrangement comprising:

an FET having a Gate electrode, a Drain electrode and a Source electrode;

a first conductor for coupling the Gate electrode to a first terminal associated with said preferred one of said two voltage sources, said first conductor providing a control voltage to disable the FET when the preferred one of the two voltage sources is activated;

a second conductor for coupling the Drain electrode to a voltage plane on said adapter card and a second terminal associated with said preferred one of said two voltage sources;

a third conductor for coupling the Source electrode to a third terminal associated with a non-preferred one of said two voltage sources; and a voltage divider circuit for connecting the Gate electrode to a forth and a fifth terminal associated with the non-preferred one of said two voltage sources wherein voltage from the none preferred source is disconnected from voltage plane if voltage from the preferred source is present.

* * * * *